(12) United States Patent
Bouton et al.

(10) Patent No.: US 10,415,653 B2
(45) Date of Patent: Sep. 17, 2019

(54) LIFT FAN CLUTCH PLATE WITH IMPROVED AXIAL POSITIONING

(71) Applicant: Rolls-Royce Corporation, Indianapolis, IN (US)

(72) Inventors: Matthew Tyler Bouton, Indianapolis, IN (US); Kevin Beckner, Indianapolis, IN (US); Andy Copeland, Greenwood, IN (US); Matt Starr, Indianapolis, IN (US); Doug Schwerin, Zionsville, IN (US); Kyle Hassler, Pittsboro, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 387 days.

(21) Appl. No.: 15/450,527

(22) Filed: Mar. 6, 2017

(65) Prior Publication Data
US 2017/0307026 A1  Oct. 26, 2017

Related U.S. Application Data

(60) Provisional application No. 62/304,811, filed on Mar. 7, 2016.

(51) Int. Cl.
*F16D 13/68* (2006.01)
*F16D 13/69* (2006.01)
(Continued)

(52) U.S. Cl.
CPC ........ *F16D 13/683* (2013.01); *B64C 29/0025* (2013.01); *B64D 35/00* (2013.01); *F02C 7/36* (2013.01); *F16D 1/0864* (2013.01); *F16D 1/0876* (2013.01); *F16D 13/38* (2013.01); *F16D 13/52* (2013.01); *F16D 13/646* (2013.01); *F16D 13/69* (2013.01); *B64D 27/10* (2013.01); *F05D 2220/90* (2013.01); *F05D 2260/4023* (2013.01); *F16D 2200/0039* (2013.01); *F16D 2250/0046* (2013.01)

(58) Field of Classification Search
CPC .............................. F16D 13/683; F16D 13/69
See application file for complete search history.

(56) References Cited

U.S. PATENT DOCUMENTS

| 3,631,953 A | 1/1972 | Snoy |
| 4,396,101 A * | 8/1983 | Black ...................... F16D 13/52 192/70.2 |

(Continued)

*Primary Examiner* — Timothy Hannon
*Assistant Examiner* — David R Morris
(74) *Attorney, Agent, or Firm* — Duane Morris LLP

(57) ABSTRACT

A clutch for a lift fan with input and output shafts on a common rotational axis, connected by disc shaped output clutch plates oriented normal to the axis. A keyway extends radially inward from a mouth at an outer diameter of each output clutch plate to a seat at an inner diameter of the respective clutch plate. At least one output shaft lug key may be positioned in the keyway and extends axially from one output clutch plate to the other output clutch plate, which couples the rotation of the output clutch plates to the rotation the output shaft and allows axial movement of the two output clutch plates relative the output shaft lug key, the output shaft has an outer radial surface and an inner radial surface. At least one input clutch plate positioned axially between the two output clutch plates and rotationally fixed to the input shaft.

20 Claims, 18 Drawing Sheets

(51) Int. Cl.
*F16D 13/52* (2006.01)
*B64D 35/00* (2006.01)
*B64C 29/00* (2006.01)
*F16D 1/08* (2006.01)
*F16D 13/64* (2006.01)
*F02C 7/36* (2006.01)
*F16D 13/38* (2006.01)
*B64D 27/10* (2006.01)

(56) References Cited

U.S. PATENT DOCUMENTS

| | | | | |
|---|---|---|---|---|
| 4,479,569 A * | 10/1984 | Kummer | | F16D 13/385 188/71.5 |
| 5,009,290 A * | 4/1991 | Harada | | F16H 57/10 188/71.5 |
| 5,560,452 A * | 10/1996 | Labougle | | F16D 65/126 188/218 XL |
| 5,992,596 A | 11/1999 | Fukushima | | |
| 6,719,113 B2 * | 4/2004 | Bonser | | F16D 13/648 192/107 R |
| 8,408,375 B2 * | 4/2013 | Copeland | | F16D 13/52 192/70.28 |
| 8,567,713 B2 | 10/2013 | Cookerly et al. | | |
| 8,944,230 B2 * | 2/2015 | Copeland | | F16D 13/52 192/70.28 |
| 9,856,922 B2 * | 1/2018 | Reisch | | F16D 13/648 |
| 2002/0108833 A1 * | 8/2002 | Bonser | | F16D 13/648 192/70.14 |
| 2009/0314601 A1 * | 12/2009 | Copeland | | F16D 13/52 192/102 |
| 2011/0024254 A1 * | 2/2011 | Cookerly | | B64D 35/00 192/70.252 |
| 2012/0090943 A1 | 4/2012 | Copeland et al. | | |
| 2013/0213759 A1 * | 8/2013 | Copeland | | F16D 13/52 192/70.28 |
| 2016/0341258 A1 * | 11/2016 | Reisch | | F16D 13/648 |
| 2017/0314625 A1 * | 11/2017 | Bouton | | F16D 1/0876 |
| 2017/0314626 A1 * | 11/2017 | Bouton | | F16D 1/0876 |
| 2018/0238398 A1 * | 8/2018 | Rippelmeyer | | F16D 13/69 |
| 2018/0355922 A1 * | 12/2018 | Bouton | | F16D 1/0876 |

* cited by examiner

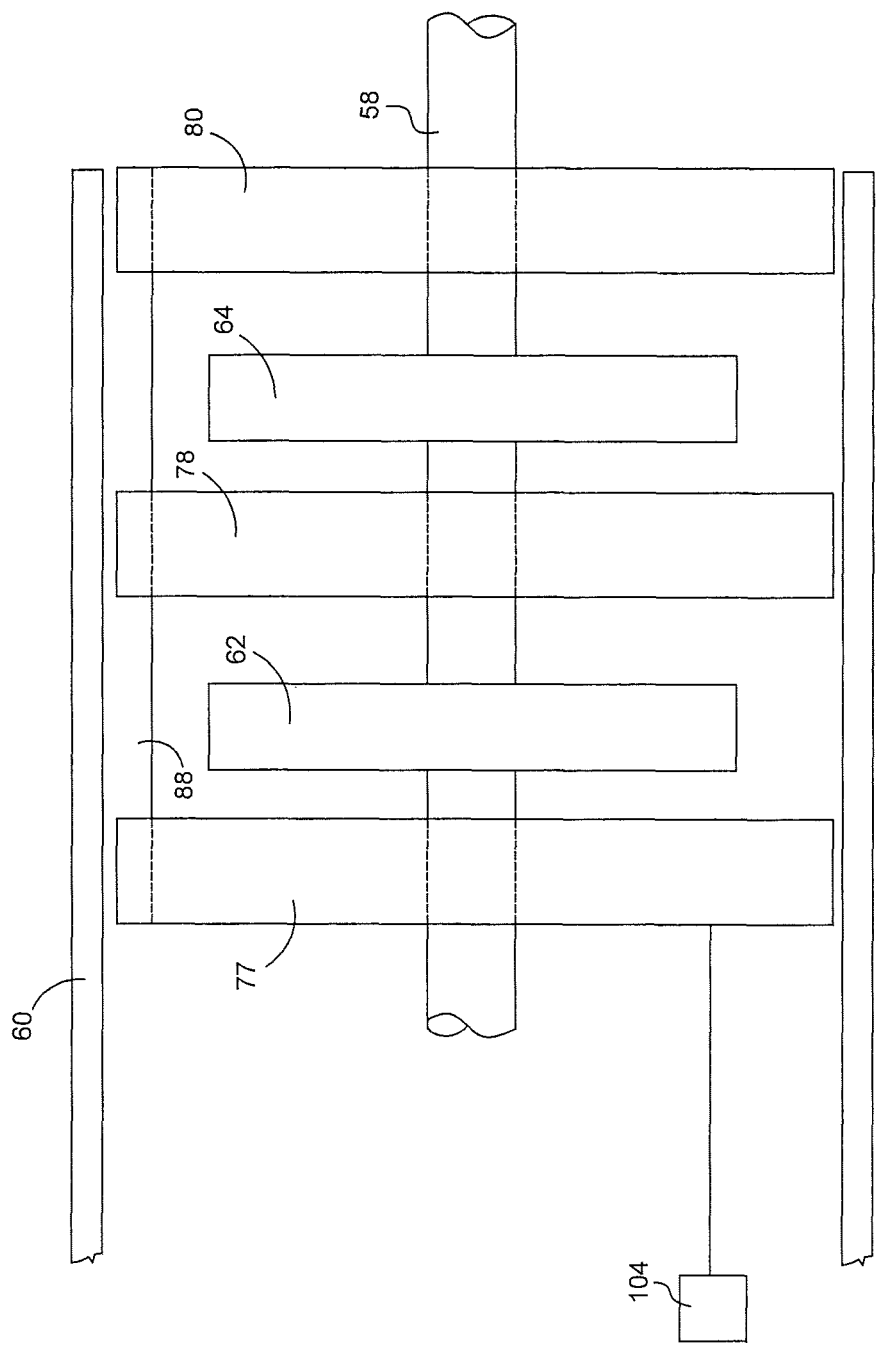

LIFT FAN CLUTCH PLATE WITH IMPROVED AXIAL POSITIONING

CROSS REFERENCE TO RELATED APPLICATIONS

The present application claims priority to U.S. Provisional Patent Application No. 62/304,811, filed Mar. 7, 2016, the entirety of which is hereby incorporated by reference.

GOVERNMENT RIGHTS

The present application was made with the United States government support under Contract No. N00019-02-C-3003, awarded by the Joint Program Office. The United States government has certain rights in the present application.

BACKGROUND

With reference to FIG. 1, there is illustrated a schematic representation of one form of an aircraft engine 50 used as a power plant for an aircraft 52. In one form the aircraft engine 50 can be a gas turbine engine having a variety of forms including turbo jet, turbo fan, and turbo shaft, to set forth just a few non-limiting examples. The aircraft 52 includes a lift fan 54 capable of producing a vertical lift force useful for providing hovering or short takeoff and vertical landing operations, among other uses. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion and other applications known to one of ordinary skill in the art.

A clutch 56 is depicted in FIG. 1 and is used to selectively couple the aircraft engine 50 to lift fan 54. In the illustrative form the clutch 56 is depicted as coupling an input shaft 58 from the aircraft engine 50 to an output shaft 60 of the lift fan 54. In some embodiments the input shaft 58 can be directly coupled to a spool shaft (not depicted) of the aircraft engine 50, but in other embodiments the input shaft 58 can be coupled through any combination of lay shafts, clutches, and/or gearboxes, to set forth just a few non-limiting examples. Furthermore, the output shaft 60 can be coupled to a fan rotor and/or shaft (not shown) of the lift fan 54 through any combination of lay shafts, clutches, and/or gearboxes, to set forth just a few non-limiting examples. The clutch 56 of the illustrative embodiment is a multi-plate clutch having friction surfaces coupled at an inner diameter to one shaft, and friction surfaces coupled at an outer diameter to the other shaft. Further details are provided below.

Turning now to FIGS. 2 and 3, perspective views are shown of an input shaft 58 and an output shaft 60 coupled with respective input clutch plates 62 and 64 and output clutch plates 77, 78 and 80. FIG. 4 is a composite illustration of features depicted in FIGS. 2 and 3. The input shaft 58 is arranged coaxially with the output shaft 60. In the illustrative form the input shaft 58 is smaller in diameter than the output shaft 60 and is thus located radially inward of the output shaft 60. The terms "input" and "output" are not intended to be limiting regarding the use of the shafts. For example, the input shaft 58 can be used to drive the lift fan 54 while the output shaft 60 can be driven by the aircraft engine 50. In these forms the shaft 60 can be used to drive the lift fan 54 and the shaft 58 can be driven by the aircraft engine 50.

In one form the input shaft 58 includes input clutch plates 62 and 64. The input clutch plates 62 and 64 are slidably engaged with the input shaft 58 and are operable to be engaged with corresponding plates associated with the output shaft 60. The input clutch plates 62 and 64 include friction surfaces on one or more of its sides 74 and 76, respectively. The friction surfaces of the sides 74 and/or 76 can be any surface having attributes associated with abradable surfaces or wear surfaces in the brake, clutch, and/or transmission arts such as, but not limited to, toughness, strength, heat resistance, adequate frictional properties, and/or relatively long life. In some forms the friction surfaces can be textured, roughened, and/or grooved. The friction surfaces can be made from a variety of materials including, but not limited to, steel, bronze, iron, iron-bronze, ceramic, metallic ceramic, graphitic carbon and metallic graphite. Though only two input clutch plates 62 and 64 are depicted in the illustrative embodiment, any number of input clutch plates can be used in other embodiments.

The output clutch plates 77, 78, and 80 are operable to be engaged with the input clutch plates 62 and 64. The output clutch plates 77, 78, and 80 include friction surfaces on one or more of its sides 90, 92, and 94, respectively. The outer periphery of the output clutch plates 77, 78, 80 are axially recessed from the friction surfaces on the sides. The friction surfaces of the sides 90, 92, and/or 94 can be any surface having attributes associated with abradable surfaces or wear surfaces in the brake, clutch, and/or transmission arts such as, but not limited to, toughness, strength, heat resistance, adequate frictional properties, and/or relatively long life. In some forms the friction surfaces can be textured, roughened, and/or grooved. The friction surfaces can be made from a variety of materials including, but not limited to, steel, bronze, iron, iron-bronze, ceramic, metallic ceramic, carbon fiber, graphitic carbon and metallic graphite. Though only three output clutch plates 77, 78, and 80 are depicted in the illustrative embodiment, any number of output clutch plates can be used in other embodiments.

The output shaft lug key 88 is coupled to the output shaft 60 through attachment members 96 and 98. The attachment members 96 and 98 can be bolts threadingly received in apertures formed in the output shaft lug key 88, but other forms of attachment members are contemplated herein. To set forth just one non-limiting example, the attachment members 96 and 98 can be fasteners such as rivets.

The output shaft lug key 88 maintains the relative clocked orientation of the output clutch plates 77, 78, and 80 and is received in the illustrative embodiment by a keyway 100 formed by cutouts 101 in the outer periphery of the output clutch plates 77, 78, and 80. In other embodiments the output shaft lug key 88 can be received by apertures formed radially inward of the outer periphery of the output clutch plates 77, 78, and 80. Although one output shaft lug key 88 is depicted, multiple lug keys 88 can be used. The cutouts 101 need not be identical in each of the output clutch plates 77, 78, and 80. In addition, the output shaft lug key 88 need not have the same shape along its length. The output shaft lug key 88 permits the output clutch plates 77 and 78 to slide relative to the output shaft lug key 88.

In a first, uncoupled state (disengaged), the input shaft 58 and the output shaft 60 are not coupled by the clutch 56. The output clutch plates 77, 78, and 80 are in an uncompressed state and do not contact, or partially contact, the input clutch plates 62 and 64. The actuator 104 is withdrawn and the output clutch plates 77, 78 and 80 axially separate naturally due to non-synchronous rotational speeds when left in the uncompressed state. Output clutch plates 77, 78 and 80 separate away from the other plates and out of contact with the input clutch plate 62.

In a second, coupled state (engaged), the actuator 104 provides a force that moves a pressure plate (not shown) axially in the direction of plate 77 and continues moving plate 77 such that it and all clutch plates 77, 78, 80, 62 and 64 are compressed and synchronized. Compression of the output clutch plate 77 with the input clutch plate 62, the output clutch plate 78 with the input clutch plates 62 and 64, and the input clutch plate 64 with the output clutch plate 80 engages the friction surfaces of the sides 74, 76, 90, 92, and 94 to couple rotation of the input shaft 58 with the output shaft 60.

A more detailed discussion of a clutch, clutch plates and their operation may be found in U.S. Pat. No. 8,567,713, the entirety of which is incorporated by reference.

It has been observed that when the lift fan clutch system with interleaved sets of plates is in the disengaged or uncoupled position, the output clutch plates 77, 78, and 80 can, under certain circumstances, tend to flutter, wobble, or have other gyroscopic instability. Such instability may suddenly cause a relatively large increase in drag torque, heat and wear at the keyway 100 which exacerbates the vibration, flutter, wobble or gyroscopic instability. This excessive wear is believed to stem from axial movement, off center plates, tilting plates, and/or interaction between keys and keyways associated with free floating output clutch plates 77, 78 and 80 as described above.

In order to obviate the deleterious effects described above, the disclosed subject matter identifies several types of mitigating systems and methods. A set of solutions are directed to preventing the output clutch plates from falling off center, another set of solutions are directed to maintaining the proper axial position of the output clutch plates during disengagement, others to reducing wear. All the solutions are ultimately directed to preventing an unbalanced condition developing in the output clutch plates and the deleterious resultant vibration, flutter, and wobble.

These and many other objects and advantages of the present subject matter will be readily apparent to one skilled in the art to which the invention pertains from a perusal of the claims, the appended drawings, and the following detailed description of preferred embodiments.

SUMMARY

The invention may consist of a clutch for a lift fan with a rotatable input and output shafts on a common axis of rotation connected by two disc shaped output clutch plates oriented normal to the axis, each of the two output clutch plates has a keyway extending radially inward from a mouth at an outer diameter of the output clutch plate to a seat at an inner diameter of the output clutch plate. At least one output shaft lug key may be positioned in the keyway of the two output clutch plates and extend axially from one output clutch plate to the other output clutch plate, the output shaft lug key couples the rotation of the output clutch plates to the rotation the output shaft and allows axial movement of the two output clutch plates relative the output shaft lug key, the output shaft has an outer radial surface and an oppositely disposed inner radial surface. At least one input clutch plate positioned axially between the two output clutch plates and rotationally fixed to the input shaft. While in an engaged position, friction is used to transfer a load from the input shaft to the output shaft via the two output clutch plates, the input clutch plates and the output shaft lug key. While in a disengaged position, each of the two output clutch plates are axially displaced from the input clutch plate; and a finger positioned between the inner surface of the output shaft lug key and the seat of the key way provides a biasing axial force on at least one of the output clutch plates and a radial force between the shaft lug key and the at least one output clutch plates.

In one embodiment of the invention comprises of two fingers, each of the two fingers providing a biasing axial force and a radial force on a respective one of the two output clutch plates. In a further embodiment a biasing axial force of one of the two fingers is opposite the biasing axial force of the another of the two fingers, while the radial force for each of the two fingers is in the same direction. In yet another embodiment a portion of the fingers are recessed within the shaft lug key. In another embodiment the fingers are attached to the shaft lug key via the same attachment mechanism the shaft lug key is attached to the output shaft. In yet another embodiment the cross section of the inner surface of the shaft lug key and the cross section of the seat of the keyway is selected from the group consisting of a trapezoidal, parabolic, rectangular, triangular, chinned and polygonal shape. The lug key may fully fill the keyway.

The lift fan clutch may have at least two substantially disc shaped output clutch plates oriented normal to an axis, each of the two output clutch plates may have a keyway extending radially inward from a mouth at an outer diameter of the output clutch plate to a seat at an inner diameter of the output clutch plate, an output shaft lug key positioned in the keyways of the two output clutch plates and extending axially from one of the two output clutch plates to the other of the two output clutch plates, the output shaft lug key couples the rotation of the output clutch plates to the rotation the output shaft and allows axial movement of the two output clutch plates relative the output shaft lug key, the output shaft lug key may have an outer radial surface and an oppositely disposed inner radial surface, may have a method to axially position the output clutch plates comprising of positioning a finger between the inner surface of the output shaft lug key and the seat of the key way to provide a biasing axial force via the finger on at least one of the output clutch plates with the finger when the clutch is in the disengaged position; and a radial force between the shaft lug key and the at least one output clutch plates.

An embodiment of the method may comprise positioning two fingers, each of the two fingers providing a biasing axial force and a radial force on a respective one of the two output clutch plates. The biasing axial force of one of the two fingers may be opposite the biasing axial force of the another of the two fingers, while the radial force for each of the two fingers may be in the same direction. In another embodiment, a portion of the fingers are recessed within the shaft lug key. In yet another embodiment the fingers may be attached to the shaft lug key via the same attachment mechanism the shaft lug key is attached to the output shaft. Within another embodiment the cross section of the inner surface of the shaft lug key and the cross section of the seat of the keyway is selected from the group consisting of a trapezoidal, parabolic, rectangular, triangular, chinned and polygonal shape, where the lug key fully may fill the keyway.

The invention may also consist of a clutch for a lift fan having rotatable input and output shafts on a common axis of rotation; two substantially disc shaped output clutch plates oriented normal to the axis. Each of the two output clutch plates may have a keyway extending radially inward from a mouth at an outer diameter of the output clutch plate to a seat at an inner diameter of the output clutch plate. At least one output shaft lug key may be positioned in the keyway of the two output clutch plates and extend axially from one of the two output clutch plates to the other of the two output clutch plates. The output shaft lug key couples the rotation of the output clutch plates to the rotation the output shaft and allowing axial movement of the two output clutch plates relative the output shaft lug key, the output shaft having an outer radial surface and an oppositely disposed inner radial surface. At least one input clutch plate may be positioned axially between the two output clutch plates, wherein the input clutch plate may be rotationally fixed to the input shaft. While in an engaged position, the two output clutch plates are in frictional communication with the input clutch plates and a load is transferred from the input shaft to the output shaft via the two output clutch plates, the input clutch plates and the output shaft lug key; when in a disengaged position, each of the two output clutch plates are axially displaced from input clutch plate; and a detent system between the output shaft lug key and the each of the two output clutch plates, wherein the detent system includes a recess that cooperates with an urger to position the output clutch plates and resist axial movement of the two output clutch plates when in the disengaged position. In one embodiment the detent system comprises a spring, a ball and a recess cooperating with the ball. In a further embodiment the spring and ball are positioned within shaft lug key and the cooperating recess is formed on the seat of the keyway. In yet a further embodiment, the spring and ball are positioned within the seat of the keyway of the output clutch plate and the cooperating recess is formed in the inner surface of the shaft lug key.

BRIEF DESCRIPTION OF THE FIGURES

FIG. 4 depicts an illustration of the illustrative lift fan clutch depicted in FIGS. 2 and 3.

DETAILED DESCRIPTION

Figure 1:
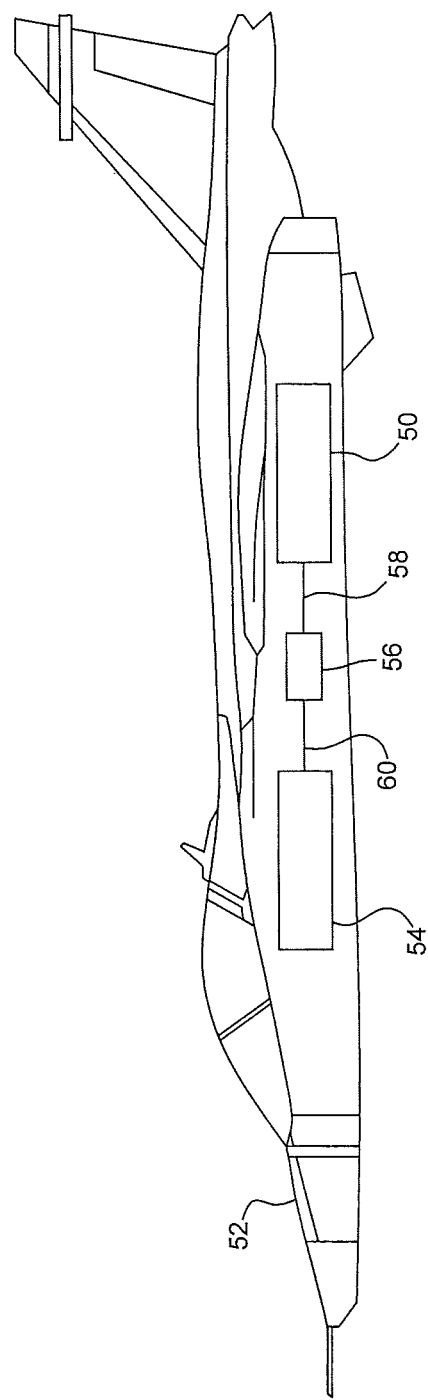
FIG. 1 is a schematic of an aircraft with an illustrative lift fan clutch.
Figure 2:
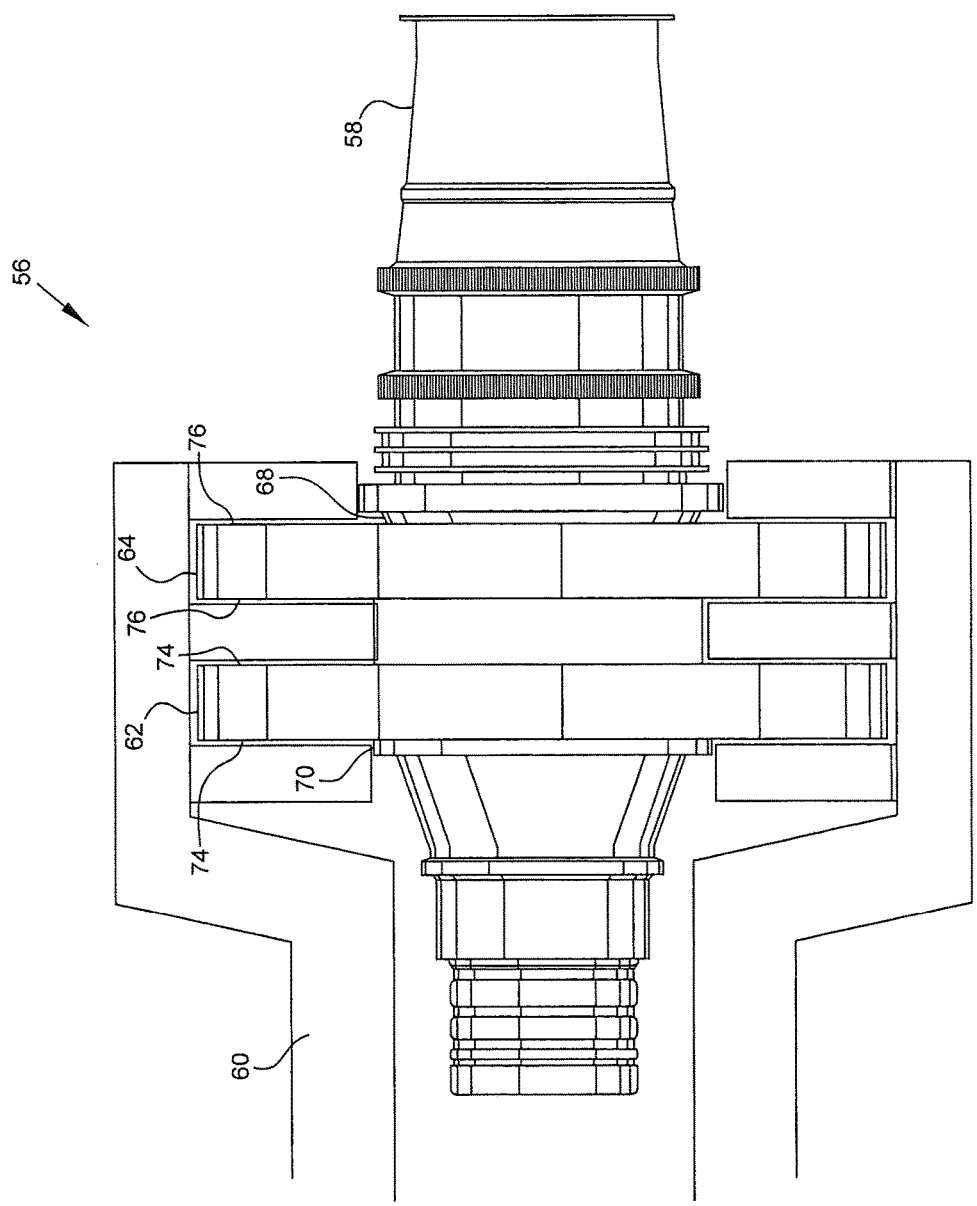
FIG. 2 depicts an input shaft and input clutch plates of an illustrative lift fan clutch.
Figure 3:
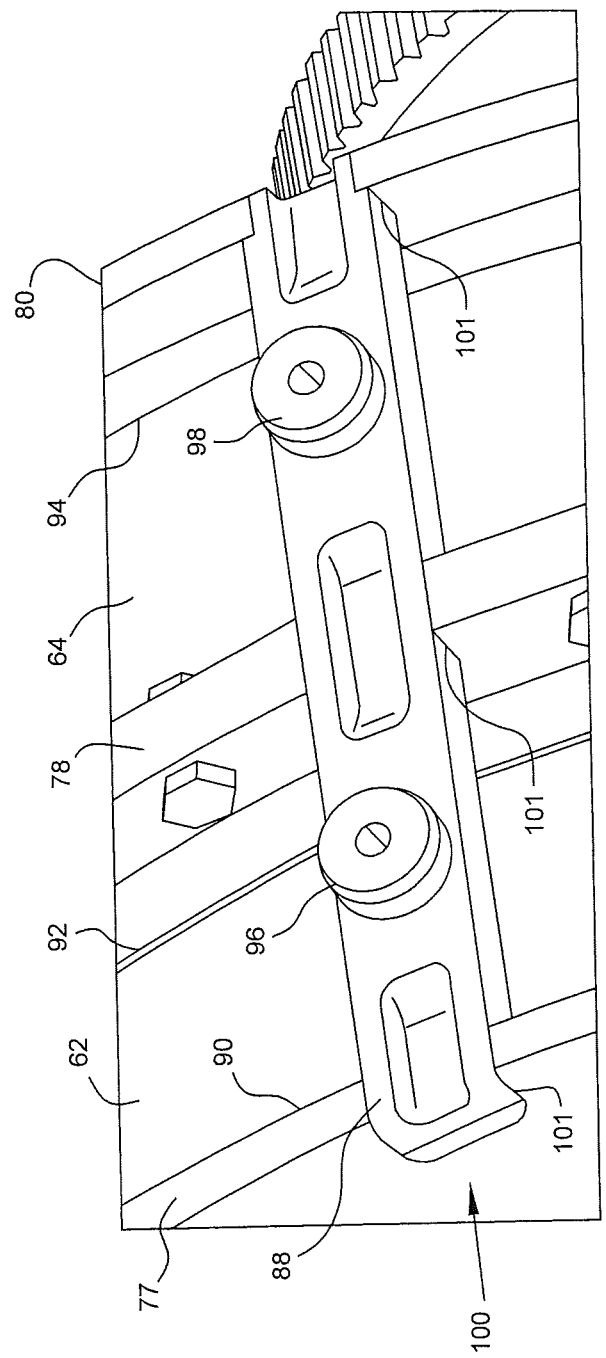
FIG. 3 depicts a partial perspective view of illustrative input clutch plates and output clutch plates.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One solution to prevent vibration, wobble, and instability of the output clutch plates 77, 78, and 80 is to dampen the response of the output clutch plates 77, 78, and 80 such that wear of the keyway 100 is prevented. There are several approaches to restrict the movement of output clutch plates 77, 78, and 80. One approach is to restrain the output clutch plates 77, 78, and 80 from axial movement in the disengaged clutch position.

Figure 5A:
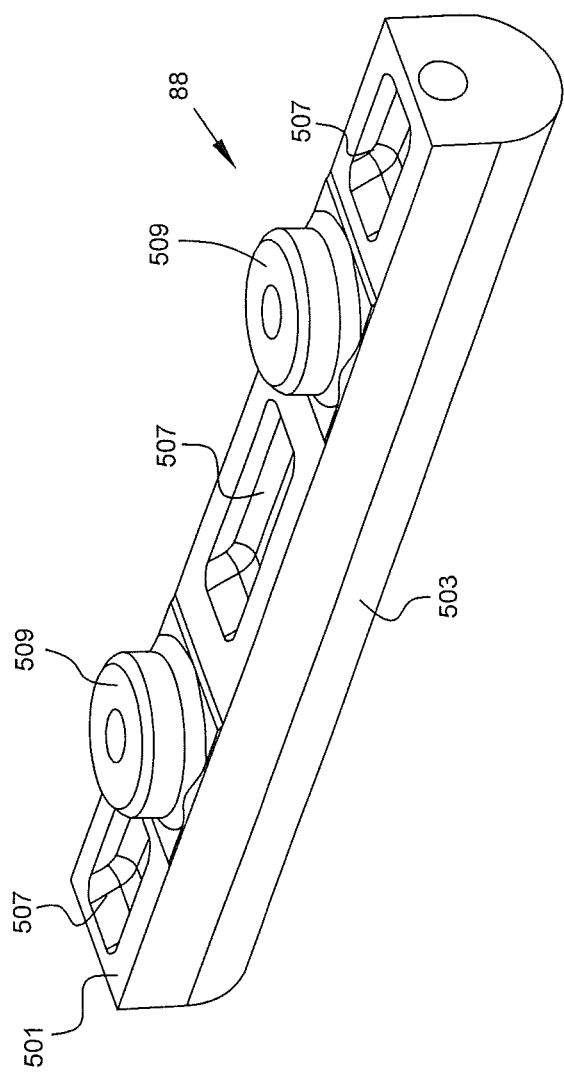
FIGS. 5a and 5b illustrate an output shaft lug key according to an embodiment of the present subject matter.
Figure 5B:
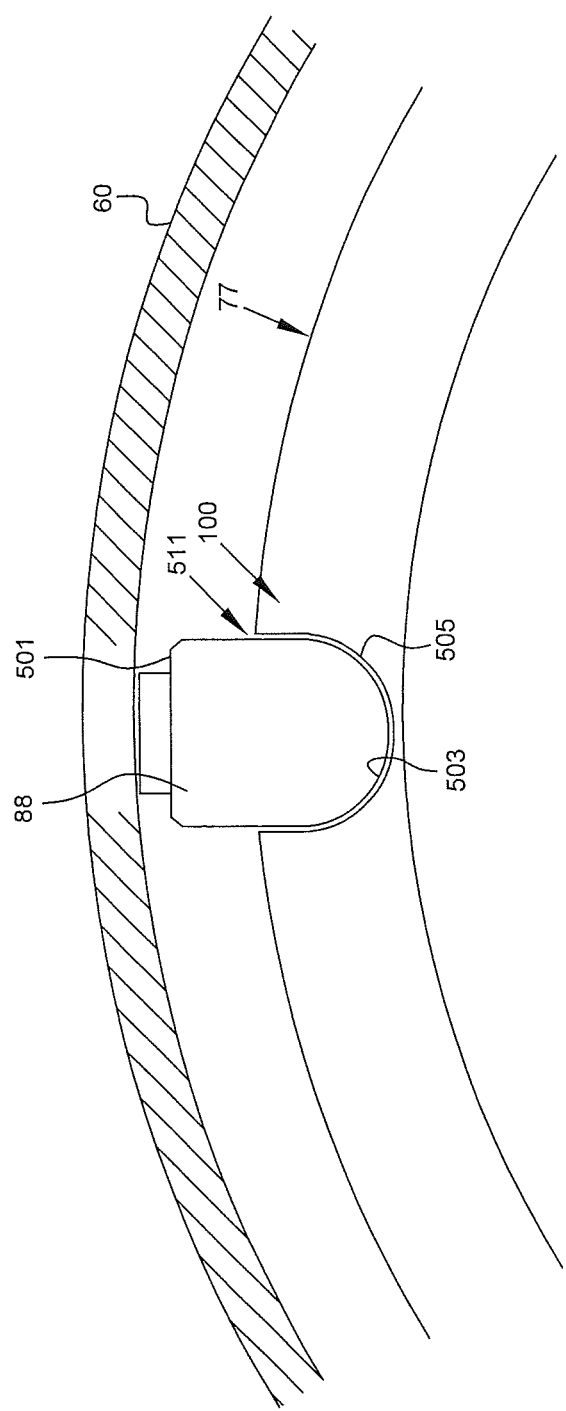

FIG. 5a illustrates a shaft lug key 88 with an outer radial surface 501 and an inner radial surface 503. The shaft lug key 88 is received by the keyway 100 as shown in FIG. 5b. The keyway 100 in the illustrative embodiment has a circular seat 505 shape to receive the inner radial surface 503. With the shaft lug key 88 fully filling the keyway 100, axial and radial movement, as well as wobble, are damped. The shaft lug key 88 of FIGS. 5a and 5b, as a result of extending to the seat 505 of the keyway 100 has an increased mass which in turn may be minimized by removing material on the outer surface 501 as shown by recess 507. Engagement protrusions 509 restrict the output clutch plates 77, 78, and 80 from being able to move off center.

The cross section of the inner surface 503 of the shaft lug key 88 and its receiving keyway 100 may also be of a trapezoidal, parabolic, rectangular, triangular or polygonal shape. The relevant characteristic with respect to this embodiment is that the lug key 88 substantially fills the keyway 100 to limit axial, radial, and tilting movement when the clutch is not engaged.

Another embodiment of the present subject matter is the implementation of stainless steel fingers 601, 602 and 603 or springs on the inner surface 503 of the shaft lug key 88. The fingers 601, 602 and 603 would dampen any axial movement as well as push the output clutch plates 77, 78 and 80 to a "neutral" or home position when the clutch is disengaged. The home position is the preferred location of the output clutch plates 77, 78, and 80 when the clutch is disengaged.

The existing bolts that mount the lug key 88 to the output shaft 60 may be used to mount the fingers 601, 602 and 603. The lug key inner surface 503 may be modified to allow the fingers to be imbedded within the key 88 and may offset any additional weight added by the fingers 601, 602 and 603 by removing stock from the lug key 88.

Figure 6:
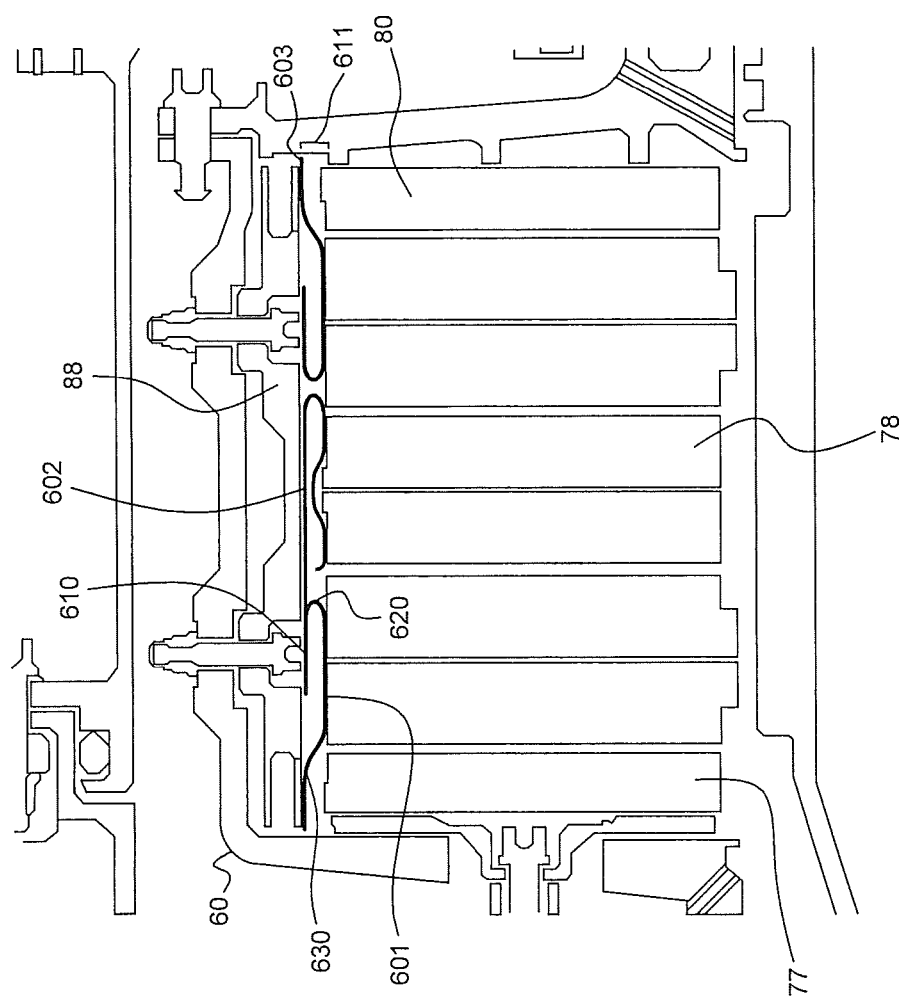
FIG. 6 is an illustration of retaining fingers according to an embodiment of the present subject matter.

The fingers 601, 602 and 603 would extend between the inner surface of the lug key through the radial gap 611 between the seat 505 of the keyway 100 and the lug key 88 as shown in FIG. 6. The shape of the fingers 601, 602 and 603 may be dependent upon the position of the output clutch plates 77, 78 and 80. The fingers 601, 602 and 603 impede axial and radial movement when the clutch is in the disengaged position. Each finger 601, 602 and 603 has a connection point 610, an elbow 620 and an arm 630 angled with respect to the clutch plate to urge the plate forward when in the disengaged position as shown in FIG. 6. Similarly the clutch plate 80 is urged backwards to its home position and the middle clutch plate 78 is urged to its middle home position by the respective fingers 601, 602 and 603. The fingers 601, 602 and 603 are configured to allow the axial movement required to engage the clutch, but otherwise dampen unwanted axial movement.

Figure 7:
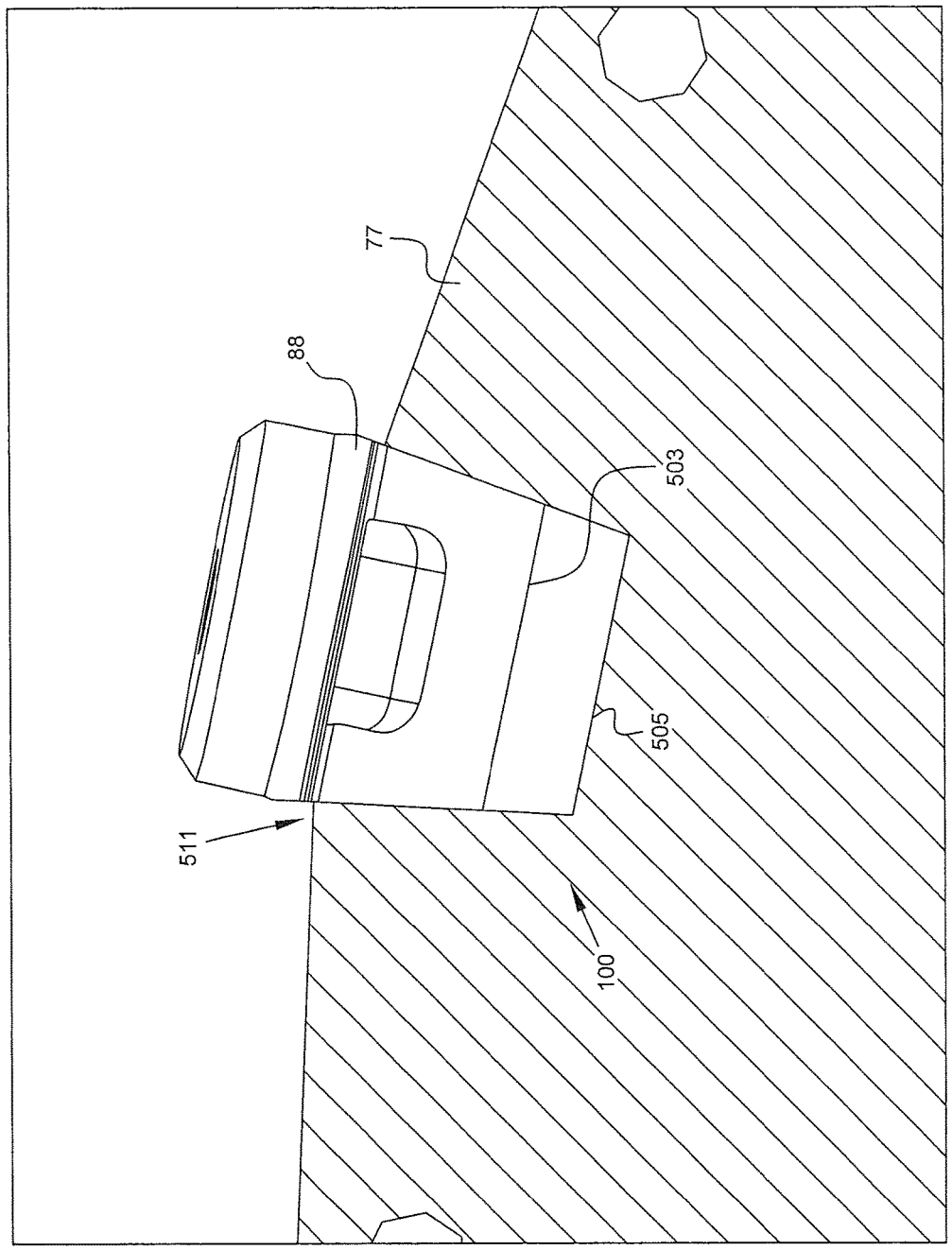
FIG. 7 is an output shaft lug key and output clutch plate keyway according to an embodiment of the present subject matter.

Another approach is shown in FIG. 7, where the keyway 100 is designed to have slightly angled sides such that the keyway 100 has a trapezoidal cross-section. For example, a 7 degree taper may be used on the keyway 100 and the inner surface 503 of the key 88. In some embodiments the mouth 511 of the keyway 100 is wider than the seat 505 of the keyway 100 and the outer surface 501 of the lug key 88 is greater than the base of the inner surface 503 of the keyway 100. Any torque transmitted to the shaft lug key 88 applies a centering force to the clutch plate 77. Any wear in the keyway 100 allows the clutch plate 77 to move radially with respect to the lug key 88 but a centering force is still applied to the plate 77.

Figure 8A:
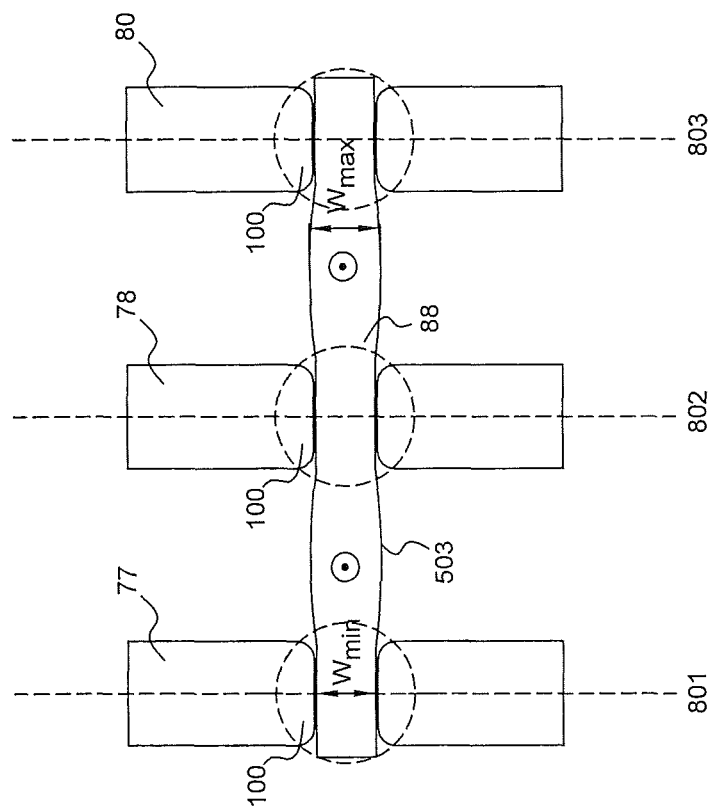
FIGS. 8a and 8b are illustrations of a lug key spline according to an embodiment of the present subject matter.
Figure 8B:
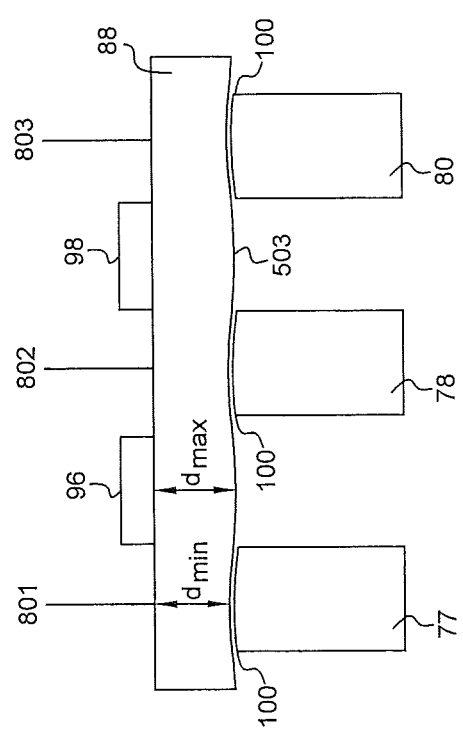

FIG. 8a shows another embodiment of the subject matter. The inner surface 503 of the lug key 88 is configured axially as a spline to encourage the plates 77, 78, 80 to stay in their home region when the clutch is not engaged. The lug key 88 increases its width between the home regions of the plates 77, 78, 80 and as shown in FIG. 8a the width of the inner surface 503 of the lug key 88 is narrowest at the clutch plate's home location. Alternatively as shown in FIG. 8b, the depth as the inner surface 503 extends radially may also be varied axially, such that the inner surface 503 extends radially further between the home location and is shallowest in the home locations of the clutch plates 77, 78, 80. The interaction of the clutch plates 77, 78, 80 and the lug key 88 given its shape will urge the clutch plates to the home position when the clutch is not engaged and retain the plates 77, 78, 80 in their respective homes, while allowing axial movement required for engaging the clutch.

Figure 9:
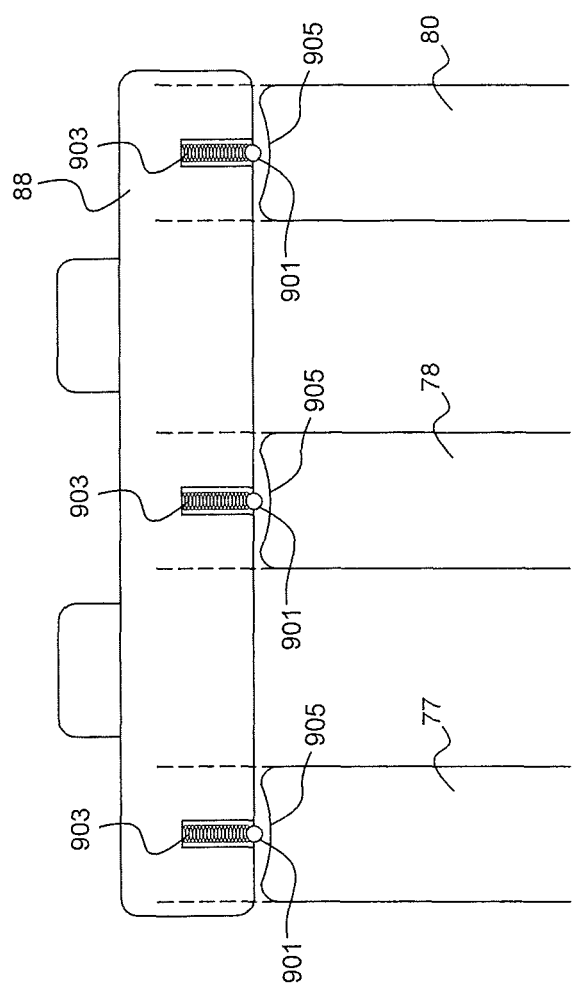
FIG. 9 is a detent system for output clutch plates according to an embodiment of the present subject matter.

FIG. 9 illustrates a detent system that may be employed to retain the clutch plates 77, 78, 80 at their home position while the clutch is disengaged. A detent is a device (as a catch, dog, or spring-operated ball) for positioning and holding one mechanical part in relation to another in a manner such that the device can be released by force applied to one of the parts. A spring 903 is retained within the shaft lug key 88 and provides a force on ball 901. The ball 901 in the embodiment shown acts as an urger. The spring 903 may also take the form of an elastic material. The keyway 100 in output clutch plates 77, 78 and 80 is shaped to provide a recess 905 or indentation that cooperates with the ball 901 to position and retain the respective clutch plates 77, 78, 80 in their home positions. When in the engaged position the ball 901 is forced up and out of the way to allow the output clutch plates 77, 78, 80 to engage with the input clutch plates 62, 64. It is also envisioned that the detent system may be reversed with the ball 901 and spring 903 in the clutch plate and the recess 905 in the inner surface 503 of the shaft lug key 88.

Figure 10:
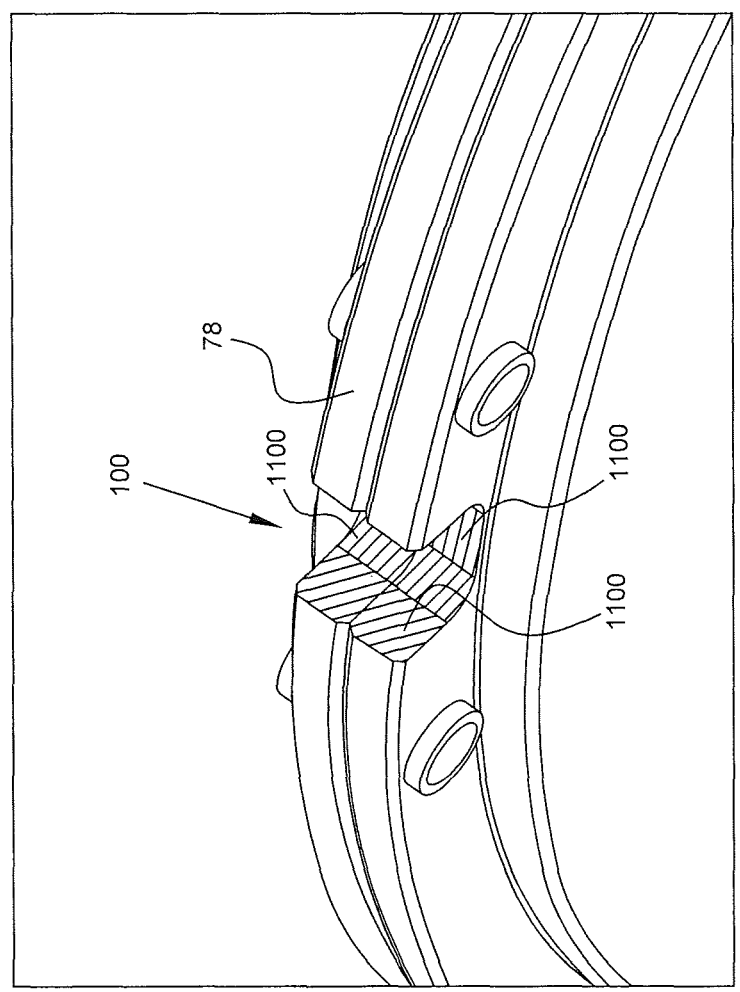
FIG. 10 is an output clutch plate keyway with a coating of wear resistance material according to an embodiment of the present subject matter.

Another approach to prevent wear and subsequent imbalance of the output clutch plates 77, 78, 80 is the addition of a coating to the shaft lug key interface surface (i.e. the surface of keyway 100) of the output clutch plates 77, 78, 80. A ceramic or similar style barrier coating could add wear resistance to the keyway surface of the output clutch plates that are typically made of relatively brittle carbon. A silicon carbine coating or other oxidant coating would protect the underlying material and prevent imbalance as a result of removal of the underlying material. In FIG. 10, the coating is shown as being applied to the seat surfaces 1100 of the output clutch plate keyway 100. The coatings are preferably selected from carbides, ceramics, cerametallic and other high temperature and wear resistant material. Additionally, the coating may also be applied to the face of the clutch plates proximate the keyway 100. The area proximate the keyway 100 face does not frictionally engage with the other plates and thus a coating, while protecting from wear induced from interfaces with the shaft lug key 88, will not interfere with the engagement of the output plates 77, 78 and 80 with the input plates 62 and 64.

Figure 11A:
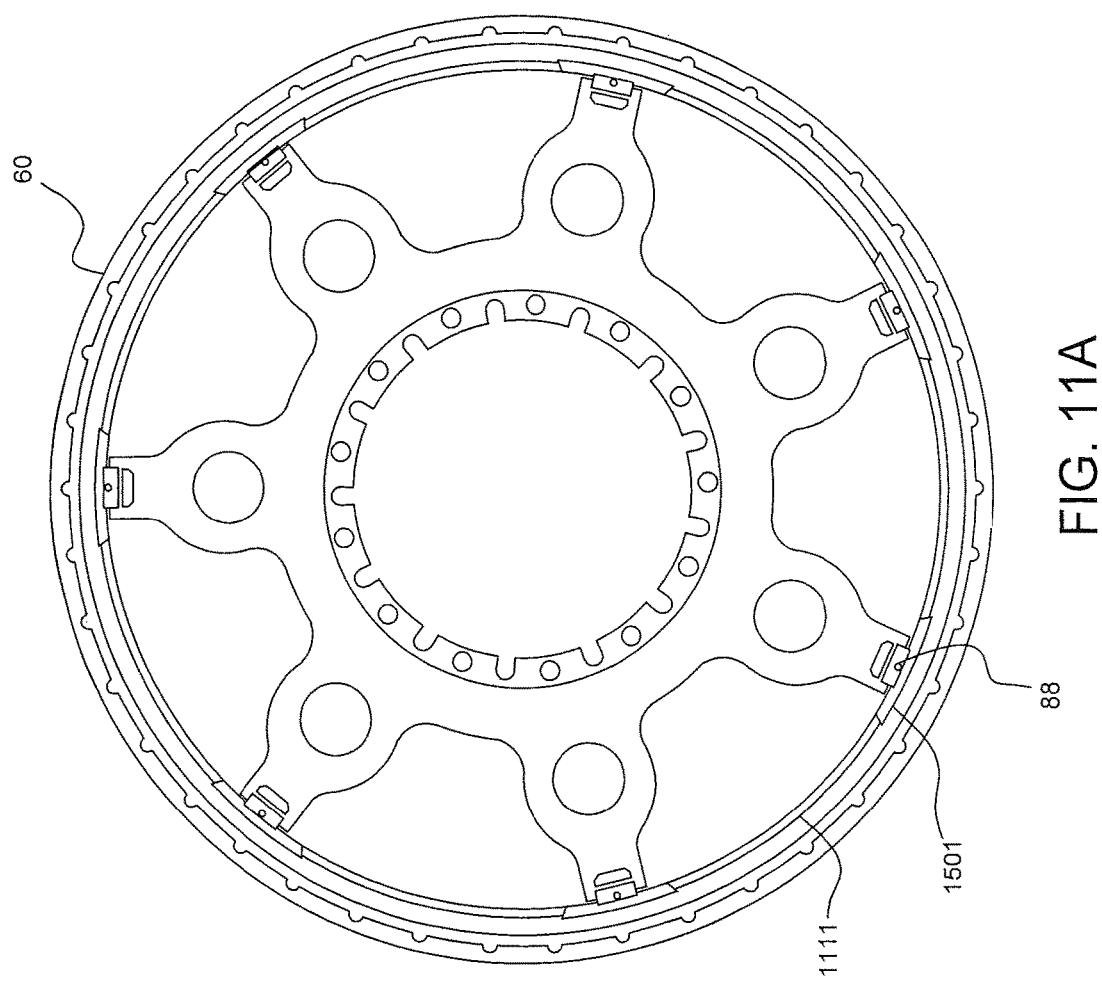
FIGS. 11a and 11b are illustrations of a shaft lug key spacer plate according to an embodiment of the present subject matter.
Figure 11B:
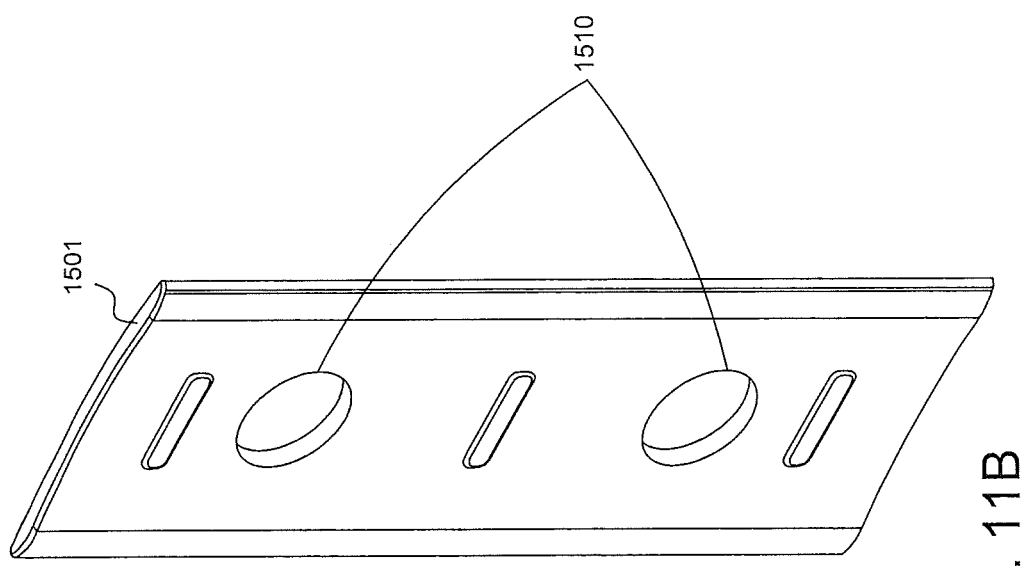

FIGS. 11a and 11b illustrate an output shaft lug key 88 with a spacer 1501 positioned between the output shaft 60 and the lug key 88. The spacer 1501 takes up additional radial space between the output shaft 60 and the periphery of the output clutch plates 77, 78 and 80. The spacers 1501 serve to limit the radial movement of the output clutch plates 77, 78 and 80 and thus limit damage that may occur if the plates 77, 78 and 80 were to contact the output shaft 60. FIG. 11b shows the spacer 1501 with a curved shape to fit securely against the inner periphery 1111 of the output shaft 60 and holes 1510 which correspond to the bolts used to secure the output shaft lug key 88. As shown in FIG. 11a, the spacers 1501 are distributed around the inner periphery 1111 of the output shaft 60 wherever an output shaft lug key 88 is positioned. The spacers 1501 may be constructed of a non-abrasive material to avoid damaging the periphery of the output clutch plates 77, 78 and 80 when in contact, or alternatively may be made of a sacrificial material to also avoid damaging the output clutch plates 77, 78 and 80.

Figure 12A:
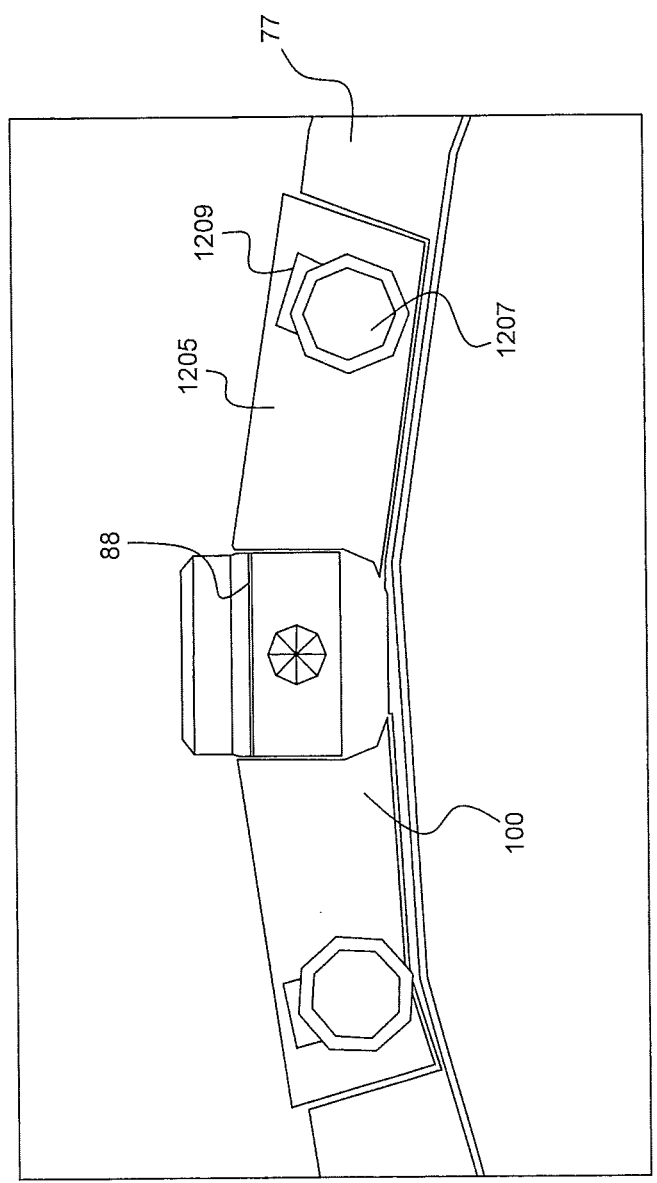
FIGS. 12a and 12b are illustrations of an output clutch plate keyway clip according to an embodiment of the present subject matter.
Figure 12B:
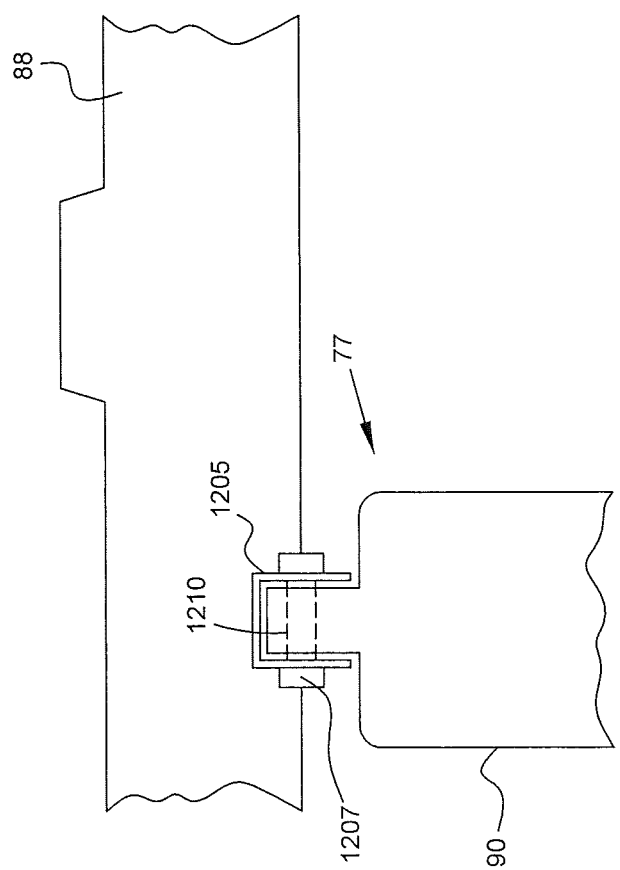

Another approach to reduce wear is illustrated in FIGS. 12a and 12b. A U-shaped metallic clip 1205 is attached to the output clutch plate 77 and the keyway 100 is defined by the clip 1205. Because the clip 1205 is formed of a metallic material, such as steel, titanium, etc. it wears slower than the material from which the output clutch plates 77, 78 and 80 are constructed. The metallic clip 1205 is attached by rivets 1207 or other appropriate fastening means, with the rivets 1207 passing through slots 1209 in the metallic clip 1305 and corresponding holes 1210 in the output clutch plate 77, 78 and 80 as shown in FIGS. 12a and 12b, or the rivets 1207 may pass through holes in the clips and slots in the output clutch plates 77. This latter configuration is not shown in FIGS. 12a and 12b. The slots 1209 either in the metallic clip 1205 or in the output clutch plates 78 allow the clip 1205 to slide radially inward/outward as needed to occupy any available free-space. This would provide a metal contact to prevent the keyway 100 from wearing. Importantly the slots 1209 allow radial movement so that the radial load would be reacted by pressing against the corresponding lug key 88 rather than pulling on the brittle clutch plates which may have limited strength margins depending on the material, which is necessary in high speed clutches that have plates with large diameters. As shown in FIG. 12b, the metallic clip 1205 encompasses the recessed outer periphery of the output clutch plate 77. Alternatively, the metallic clip 1205 may be attached via adhesive, crimping or bolting to the output clutch plate 77; however this alternative may unduly radially load the output clutch plate 77.

Figure 13:
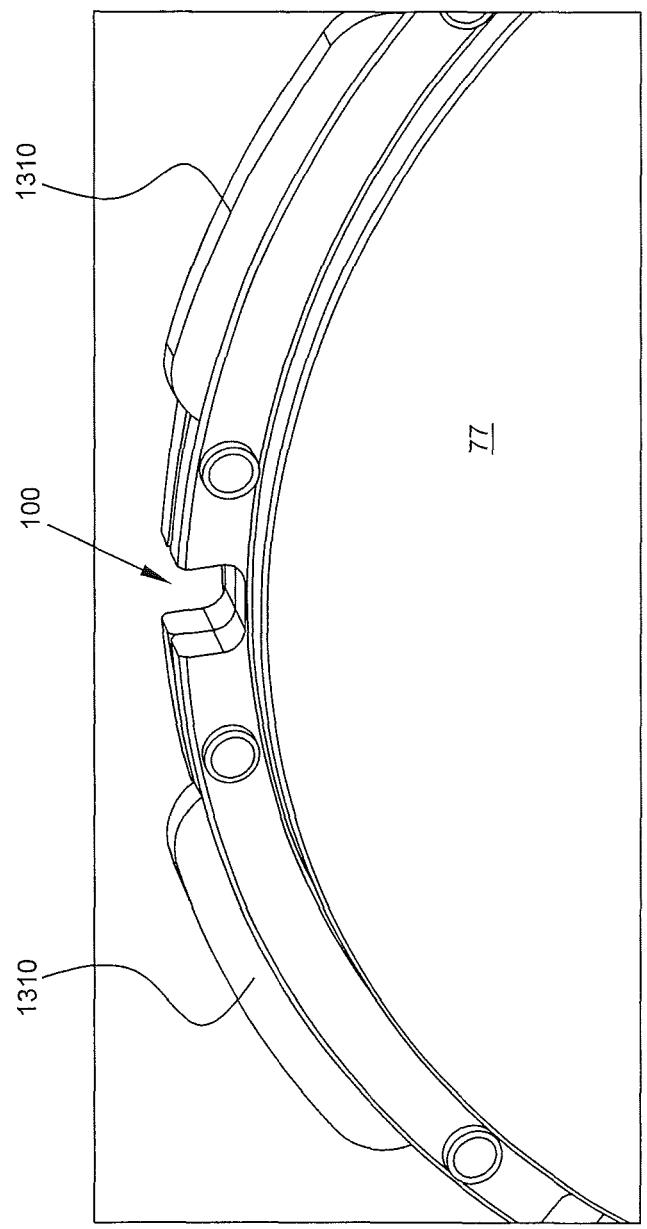
FIG. 13 is an output clutch plate with a tab according to an embodiment of the present subject matter.

FIG. 13 shows a plurality of tabs 1310 extending from the outer periphery of the output clutch plate 77. The tabs 1310 serve as a stand-off to the clutch plates. The tabs 1310 occupy the free space outboard of the clutch plates 77, 78 and 80, preventing tilting of the clutch plates 77, 78 and 80. The tabs 1310 interact with the output shaft 60 to restrict the clutch plate 77, 78 and 80 from being able to move off center and thus keep the clutch plates 77, 78 and 80 balanced within the desired operating limits. These tabs 1310 may also serve as sacrificial tabs to prevent damage to the frictional surfaces of the clutch plate 77. The tabs 1310 may be distributed around the outer periphery of the output clutch plate 77 and may be positioned with respect to the keyways 100. For example, the tabs 1310 may be placed circumferentially between adjacent keyways 100, or as shown on either side of the keyway 100. The tabs 1310 may be integral to the clutch plates 77, 78 and 80 or made of another material such as metal that exhibits better wear characteristics. The tabs 1310 may also be arranged in pairs and attached to opposite axial faces of the outer periphery of the clutch plate 77. The use of tab pairs will further limit pitch and yaw of the clutch plate 77.

Figure 14:
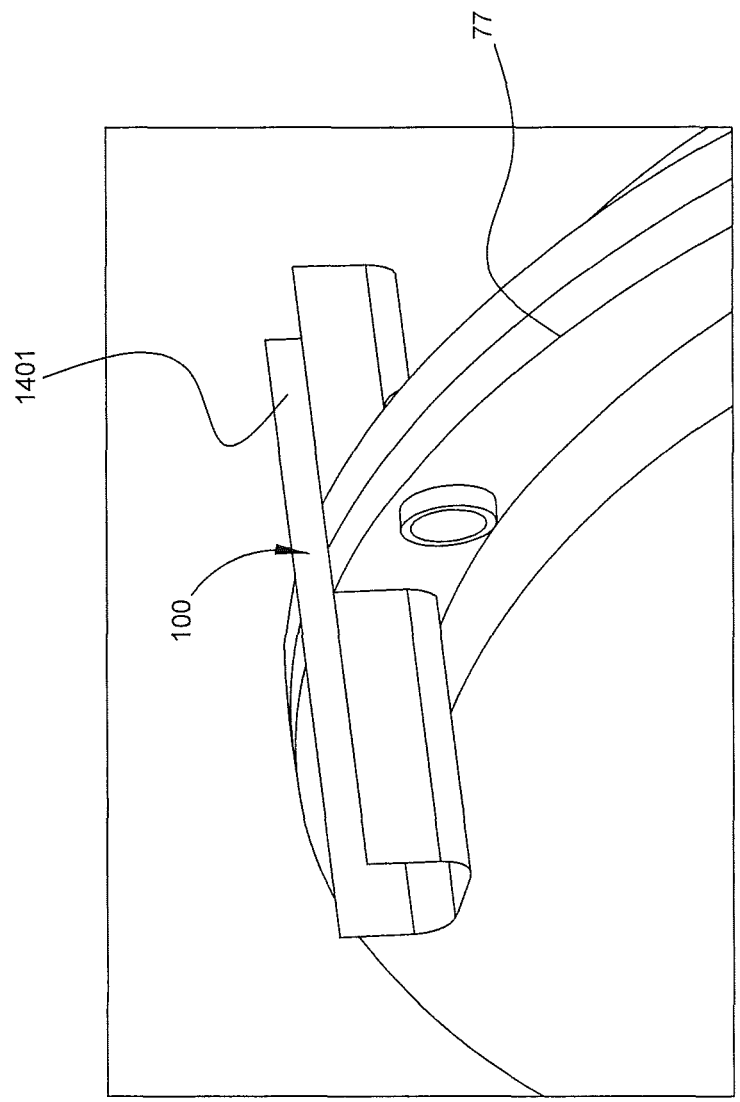
FIG. 14 is an output clutch plate keyway channel flange according to an embodiment of the present subject matter.

A final approach to preventing wear and imbalance is shown in FIG. 14. Metal clips 1401 received in the outer periphery of the clutch plate 77 define the keyway 100. The metal clips 1401 extend axially forward and aft of the clutch plate 77. These axially longer metal clips 1401 prevent the clutch plate 77 from tilting. By limiting the axial movement due to tilting, the metallic clip can help reduce the amount of wear on the output clutch plate 77. In addition, by restricting tilting of the output clutch plate 77, wobbling and imbalance of the clutch plates 77, 78 and 80 are also dampened. As shown in FIG. 14, the metallic clip 1401 forms an elongated channel that is adapted to receive the shaft lug key 88 and extends axially along a shaft lug key 88 which increases the contact area of the interface between the keyway 100 and the lug key 88 and thus reduces stress concentrations and more effectively resists axial movement than key/keyway interfaces with less contact area. The extended metallic clips 1401 reduce pitching, yawing and axial translation of the output clutch plates 77, 78 and 80. Because of the possibility of increased torque transmitted from the metal clips 1401 to the periphery of the clutch plates 77, 78 and 80, additional flanges may extend circumferentially from the metal clip 1401 in order to attach the clip 1401 to the clutch plates 77, 78 and 80 in a manner similar to that shown in FIGS. 12a and 12b. The flanges may reduce localized loads and distribute the loads over a greater area. The axial length of the metallic clips 1401 are a function of the axial thickness of the adjacent input clutch plates and the proximity of the output clutch plates 77, 78 and 80 to the axial bounds of the clutch. The metallic clips 1410 may take the form of a C-channel as shown in FIG. 14. The clip 1410 may also be tapered radially as it extends axially, thus reducing the weight load of the clip 1410.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What we claim is:

1. A clutch for a lift fan having;
   a rotatable input shaft and a rotatable output shaft having a common axis of rotation;
   two substantially disc shaped output clutch plates oriented normal to the axis, each of the two output clutch plates having a keyway extending radially inward from a mouth at an outer diameter of the output clutch plate to a seat at an inner diameter of the output clutch plate;
   at least one output shaft lug key positioned in the keyway of the two output clutch plates and extending axially from one of the two output clutch plates to the other of the two output clutch plates, the output shaft lug key coupling the rotation of the output clutch plates to the rotation the output shaft and allowing axial movement of the two output clutch plates relative the output shaft lug key, the output shaft lug key having an outer radial surface and an oppositely disposed inner radial surface;
   at least one input clutch plate positioned axially between the two output clutch plates, wherein the input clutch plate is rotationally fixed to the input shaft;
   wherein in an engaged position, the two output clutch plates are in frictional communication with the input clutch plates and a load is transferred from the input shaft to the output shaft via the two output clutch plates, the input clutch plates and the output shaft lug key;
   wherein in a disengaged position, each of the two output clutch plates are axially displaced from input clutch plate; and
   a finger positioned between the inner surface of the output shaft lug key and the seat of the key way, said finger providing a biasing axial force on at least one of the output clutch plates when the clutch is in the disengaged position and a radial force between the shaft lug key and the at least one output clutch plates.

2. The clutch of claim 1, further comprising two fingers, each of the two fingers providing a biasing axial force and a radial force on a respective one of the two output clutch plates.

3. The clutch of claim 2, wherein the biasing axial force of one of the two fingers is opposite the biasing axial force of the another of the two fingers.

4. The clutch of claim 3, wherein the radial force for each of the two fingers is in the same direction.

5. The clutch of claim 1, wherein a portion of the fingers are recessed within the shaft lug key.

6. The clutch of claim 1, wherein the fingers are attached to the shaft lug key via the same attachment mechanism the shaft lug key is attached to the output shaft.

7. The clutch of claim 1, wherein the cross section of the inner surface of the shaft lug key and the cross section of the seat of the keyway is selected from the group consisting of a trapezoidal, parabolic, rectangular, triangular, chinned and polygonal shape.

8. The clutch of claim 1 wherein the lug key fully fills the keyway.

9. In a lift fan clutch having at least two substantially disc shaped output clutch plates oriented normal to an axis, each of the two output clutch plates having a keyway extending radially inward from a mouth at an outer diameter of the output clutch plate to a seat at an inner diameter of the output clutch plate, an output shaft lug key positioned in the keyways of the two output clutch plates and extending axially from one of the two output clutch plates to the other of the two output clutch plates, the output shaft lug key coupling the rotation of the output clutch plates to the rotation the output shaft and allows axial movement of the two output clutch plates relative the output shaft lug key, the output shaft lug key having an outer radial surface and an oppositely disposed inner radial surface, a method to axially position the output clutch plates comprising:

positioning a finger between the inner surface of the output shaft lug key and the seat of the key way;

providing a biasing axial force via the finger on at least one of the output clutch plates with the finger when the clutch is in the disengaged position; and providing a radial force between the shaft lug key and the at least one output clutch plates via the finger.

10. The method of claim 9 further comprising positioning two fingers, each of the two fingers providing a biasing axial force and a radial force on a respective one of the two output clutch plates.

11. The method of claim 10, wherein the biasing axial force of one of the two fingers is opposite the biasing axial force of the another of the two fingers.

12. The method of claim 11, wherein the radial force for each of the two fingers is in the same direction.

13. The method of claim 9, wherein a portion of the fingers are recessed within the shaft lug key.

14. The method of claim 9, wherein the fingers are attached to the shaft lug key via the same attachment mechanism the shaft lug key is attached to the output shaft.

15. The method of claim 9, wherein the cross section of the inner surface of the shaft lug key and the cross section of the seat of the keyway is selected from the group consisting of a trapezoidal, parabolic, rectangular, triangular, chinned and polygonal shape.

16. The method of claim 9 wherein the lug key fully fills the keyway.

17. A clutch for a lift fan having;

a rotatable input shaft and a rotatable output shaft having a common axis of rotation;

two substantially disc shaped output clutch plates oriented normal to the axis, each of the two output clutch plates having a keyway extending radially inward from a mouth at an outer diameter of the output clutch plate to a seat at an inner diameter of the output clutch plate;

at least one output shaft lug key positioned in the keyway of the two output clutch plates and extending axially from one of the two output clutch plates to the other of the two output clutch plates, the output shaft lug key coupling the rotation of the output clutch plates to the rotation the output shaft and allowing axial movement of the two output clutch plates relative the output shaft lug key, the output shaft lug key having an outer radial surface and an oppositely disposed inner radial surface;

at least one input clutch plate positioned axially between the two output clutch plates, wherein the input clutch plate is rotationally fixed to the input shaft;

wherein in an engaged position, the two output clutch plates are in frictional communication with the input clutch plates and a load is transferred from the input shaft to the output shaft via the two output clutch plates, the input clutch plates and the output shaft lug key;

wherein in a disengaged position, each of the two output clutch plates are axially displaced from input clutch plate; and a detent system between the output shaft lug key and the each of the two output clutch plates, wherein the detent system includes a recess that cooperates with an urger to position the output clutch plates and resist axial movement of the two output clutch plates when in the disengaged position.

18. The clutch of claim 17, wherein the detent system comprises a spring, a ball and a recess cooperating with the ball.

19. The clutch of claim 18, wherein the spring and ball are positioned within shaft lug key and the cooperating recess is formed on the seat of the keyway.

20. The clutch of claim 18, wherein the spring and ball are positioned within the seat of the keyway of the output clutch plate and the cooperating recess is formed in the inner surface of the shaft lug key.

\* \* \* \* \*